April 16, 1968 W. J. HAMPSHIRE 3,378,613
METHOD FOR MAKING A FIBER REINFORCED MATERIAL
Filed May 6, 1965 3 Sheets-Sheet 1

INVENTOR.
WILLIAM J. HAMPSHIRE
BY
ATTORNEY

April 16, 1968  W. J. HAMPSHIRE  3,378,613
METHOD FOR MAKING A FIBER REINFORCED MATERIAL
Filed May 6, 1965  3 Sheets-Sheet 3

INVENTOR.
WILLIAM J. HAMPSHIRE
BY
ATTORNEY

United States Patent Office 3,378,613
Patented Apr. 16, 1968

3,378,613
METHOD FOR MAKING A FIBER
REINFORCED MATERIAL
William J. Hampshire, Cuyahoga Falls, Ohio, assignor to
Goodyear Aerospace Corporation, Akron, Ohio, a corporation of Delaware
Filed May 6, 1965, Ser. No. 453,592
7 Claims. (Cl. 264—45)

ABSTRACT OF THE DISCLOSURE

A method of making a fiber reinforced molded material which simulates a woven material by laying a mixture of resin and elongated fiber glass strands in ribbon-like overlapping streams to form layers onto a receiving sheet to thereby form a plurality of sequentially advancing diamond-shaped patterns equally spaced from each other and having a fabric-like consistency. The elongated glass fibers are substantially aligned with the laid ribbon-like streams. The uncured material is produced in flat layered sheets and is subsequently press molded in a manner to cause adjacent layers to slide over each other wherein the fabric-like consistency is retained without losing the strength features of the fabric-like quality.

---

This invention relates to a method for making a fiber reinforced molded material, which invention is especially adapted to compressive molding and automated production methods where the material will flow readily to completely conform to a desired shape, while still retaining the high strength characteristics related to those of a resin impregnated cured fabric.

Heretofore, it has been well known in plastic and thermosetting resin molding techniques that the inclusion of a fiberglass fabric impregnated with an epoxy, plastic, or thermosetting resin substantially increases the strength of the structure. Some attempts have been made with selective cure systems utilizing pre-mixes or gunk molding with short lengths of glass fibers in the mix being molded to the desired shape. For example, Patent No. 2,498,785 discloses a rubber article and method of making the same whereby a glass fiber is mixed with latex foam to increase greatly the shear strength thereof. However, this method, which utilizes a very small percent of glass fiber of very short length, is not readily adaptable to a uniform flow during a contoured or complex molding process to achieve a uniform spread of fibers in interrelated or interlaced relationship so as to maintain effectively a fabric-like consistency during the forming of the material. With the extended use of plastic, epoxy, and thermosetting resins in molding and forming various articles, it becomes very important to be able to provide a molded article having thin walls, but which simulate a woven resin impregnated fiberglass sheet so as to provide great strength.

Therefore, it is the general object of the present invention to avoid and overcome the foregoing and other difficulties of and objections to prior art practices by the provisions of a fiber reinforced non-woven fabric-like molded material which simulates a woven material, but which is readily moldable to various contours and shapes while still retaining its fabric-like consistency for great strength with thin wall thickness.

A further object of the invention is to provide a low cost process for making a fiber reinforced molded material simulating a resin impregnated fiberglass sheet but having moldable characteristics to provide thin wall thicknesses with great strength.

A further object of the invention is to provide a method for making a fiber reinforced non-woven fabric-like molded material with the fibers therein being interlaced, which material may be produced in flat sheets in an uncured condition, and be subsequently molded to a particular shape and cured therein by applying pressure and heat with the fabric-like consistencies of the material flowing to the desired contour during the molding to retain the fabric-like strength qualities after molding.

A further object of the invention is to provide a method for making a fiber reinforced molded material where a material is formed by spraying a mixture of resin and elongated glass strands in ribbon-like strips onto a receiving sheet forming a plurality of sequentially advancing diamond shapes equally spaced from each other to provide a fabric-like consistency since the elongated glass fibers substantially align in the direction of the sprayed ribbons of material.

The aforesaid objects of the invention and other objects which will become apparent as the description proceeds are achieved by providing in a fiber reinforced molded material the combination of a flat elongate movable release carrier base, a polyester resin, a plurality of multiple end fibrous glass roving elongated fibers intermixed into the resin, the mixture being sprayed onto the base in a plurality of thin streams with the fibers substantially aligned with the streams in a plurality of sequentially advancing spaced interwoven, overlapping diamond shapes, the centerlines of each being equally spaced one from another at least one-half the width of the thin streams, the combination being flowable when molded under pressure and being cured at a suitable temperature to a desired thickness and shape.

The method of the invention for making a fiber reinforced molded material consists in the steps of moving a carrying film along a path, laying a mixture of multiple end fibrous glass roving elongated fibers and a thermosetting resin in ribbon-like strips on the film with the fibers substantially aligned with the ribbons so the ribbons form a plurality of sequentially advancing spaced interwoven, overlapping diamond shapes, the centerlines of each equally spaced one from another at least one-half the width of the ribbons, adjusting the belt or carrying film speed to collect a laminar deposition of the thickness desired, conveying the collected laminar non-woven fabric-like material web through slitters and timed cutoff establishing the size and weight desired for molding, then selectively taken up in a roll or stacked in the flat ready for molding under pressure with or without the release film on either or both sides causing lateral, interlaminar and pantographic flow to a matched die or pressure bag controlled thickness and shape, then heat curing the mixture without losing the relation of the fibers to each other maintaining high strength throughout the molded part.

For a better understanding of the invention, reference should be had to the accompanying drawings wherein.

Figure 1:
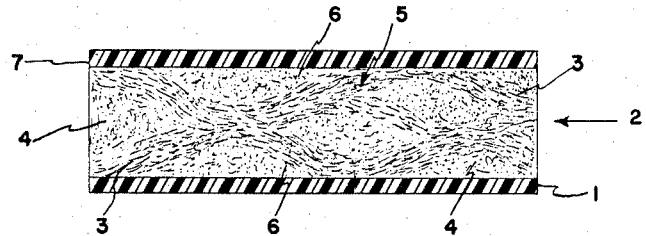
FIGURE 1 is an enlarged broken away, vertical cross sectional view of the material formed comprising a preferred embodiment of the invention taken substantially on line 1—1 of FIGURE 2.

With reference to the form of the invention illustrated in FIGURE 1 of the drawings, the numeral 1 indicates generally a bottom release film upon which the material is made. The release film 1, as indicated in FIGURE 1, may be a plastic or plastic composition, but could also be paper, or any other suitable carrier for the material formed thereon. Generally, the invention contemplates that the film 1 will be of a considerable width, for example, 3 to 5 ft. wide, and of a long length, as normally wound onto a roll. This film is then moved in a longitudinal path, for example, on a conveyor belt, with the material then formed thereon, as more particularly indicated in FIGURE 2, and as more fully explained below. A fiber reinforced moldable material, generally indicated by the numeral 2, is formed on the top of the release film 1. Normally, as explained below, this material 2 is formed as the film 1 moves in an elongated path, although it should be understood as will be more fully explained below that there does not need to be movement of the film 1 to form the material thereon. Essentially, the material 2, which represents one embodiment of the invention, consists of a plurality of ribbon or strip-like mixtures of resin and elongated fibers which are laid down in a fabric fashion but which are overlapping with adjacent ribbons or strips. The fibers are normally multiple end fibrous glass roving, hard silane, or other suitable finish, elongated fibers. Thus, in FIGURE 1, what could be called a warp yarns 3 are interwoven over and under a plurality of what could be called weft yarns 4. Naturally, it is to be understood that each of what we call warp and weft yarns 3 and 4 comprises a ribbon or strip of resin having elongated glass fibers intermixed therewith. The intermixture of fibers in the ribbons or streams, representing the fabric-like consistency, gives each ribbon or stream, as indicated by the yarns 3 and 4, some semblance of consistency and uniformity in each ribbon or stream as it is laid down to sequentially form the material, as more fully explained below. The longitudinally running warp yarns 3 clearly illustrates the random and rather full intermixing of a plurality of glass fibers or rovings, generally indicated by the numeral 5, as they conform to the path of the ribbon or stream as it is formed in the material. It is anticipated that the glass fibers will be between about one to about twelve inches in length. It has been found that although flowability of the material will be excellent with fibers in lengths within this range, that the flowable properties are increased when fiber lengths are shortened to the lower limits of the range. It will be seen in FIGURE 1 that each of the yarns 3 and 4 thins along the lateral edges as indicated at 6 to make a full and continuous material.

The invention further contemplates that a top release film, indicated generally by the numeral 7, might be placed on top of the material after it is formed, and before it is cured. A normal calendering operation could be used preferably to place film 7 in position. This top release film 7 substantially confines the material 2 as laid onto the bottom release film 1, and prevents intermixing of material stacked on a shelf, or rolled up for storage. Normally, the resin laid down in the streams or ribbons in the molded material 2 will have a proper catalyst added to provide a cure time as desired. The invention contemplates that the curing will be accomplished under the influences of pressure and heat with the material 2 being formed to a desired contour at that time. It is under the influence of pressure and heat that some gaps which are normally inherent with laying the mixed fibers and resin down in streams or ribbons to provide the substantial criss-crossed, interrelated relation shown in FIGURE 1 will be filled by excess resin flowing therein.

Figure 2:
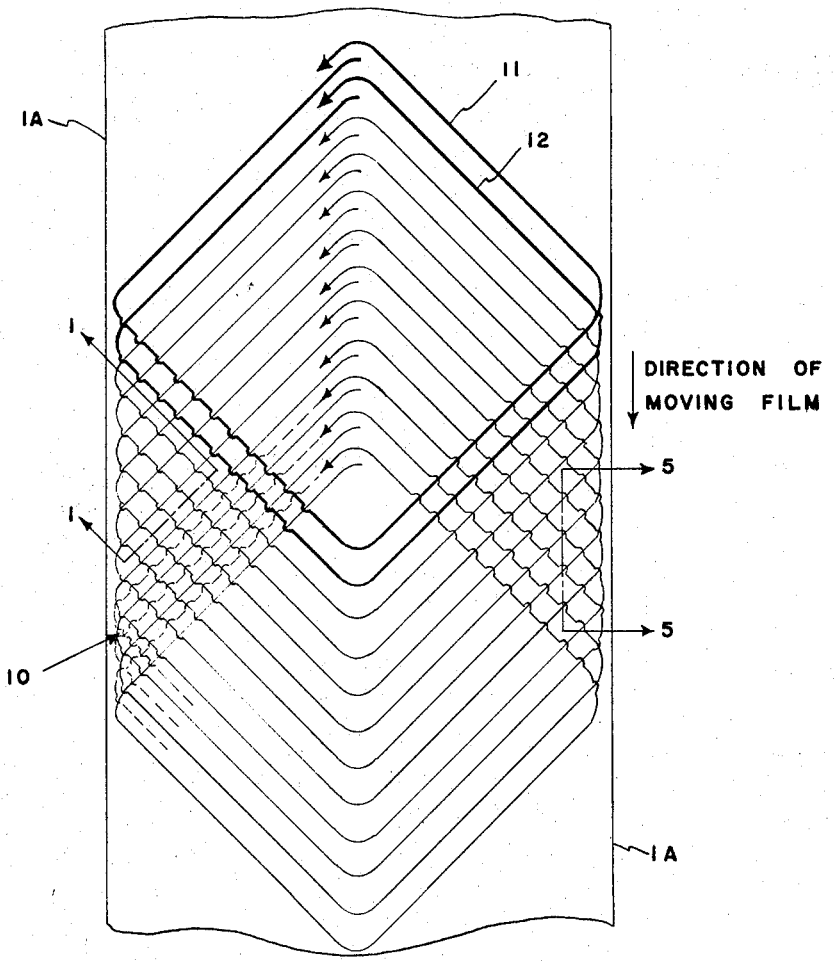
FIGURE 2 is a broken away plan view, showing a preferred method of forming the material of FIGURE 1.
Figure 4:
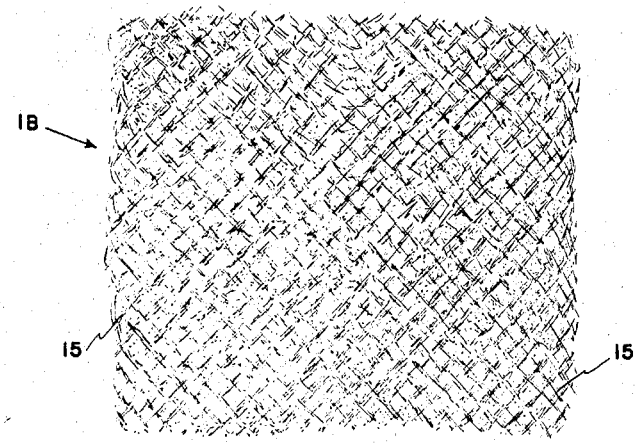
FIGURE 4 is a fragmentary plan view of the material formed using the method shown in FIGURE 2.

FIGURE 2 illustrates a method of laying down the strips or ribbons of yarns 3 and 4 in FIGURE 1. In this instance, an elongated bottom release film 1A is shown with the paths representing a plurality of ribbons or streams of intermixed resins and fibers laid in a criss-crossing relationship resembling a fabric. A material 1B in FIGURE 4 illustrates what the material made, according to the pattern of FIGURE 2, will resemble. The heavier areas 15 indicate the overlapped portion of each adjacent ribbon or stream. The patchwork quilt appearance is the result of the elongated fibers or rovings conforming to the direction with which each stream or ribbon is laid.

Many methods could be utilized to lay the criss-cross relationship indicated in part at the top of FIGURE 2, indicated generally by the numeral 10. One possible method to achieve an interrelated or criss-cross pattern might be to lay the ribbons or streams of intermixed resin and fibers as diamond shaped patterns, indicated generally by the heavy lined patterns 11 and 12, respectively.

It should be understood that a plurality of sequentially laid streams in the pattern of advancing or overlapping diamonds equally spaced from each other will provide the criss-cross pattern shown in FIGURE 2. Thus, with a diamond-shaped pattern, each laid successively on top of the other, we have what could be called a diamond fish scale pattern providing the interrelated and interwoven material. This so-called fish scale pattern becomes extremely easy to lay down to achieve the criss-cross fabric-like structure desired. In fact, it is anticipated that this fish scale pattern might appropriately be laid by means of a spray nozzle, similar to that shown in Patent No. 3,073,534. It has been found that spraying a desired resin and fiber mixture in a nozzle such as that shown in the above-identified patent, will lay substantially the ribbons or streams desired and have about 70 to 80 percent of the fibers in elongated aligned, or oriented position with the stream as it is laid. The percent elongated alignment of fibers varies with the fiber length and nozzle panning speed.

Figures 5, 6:
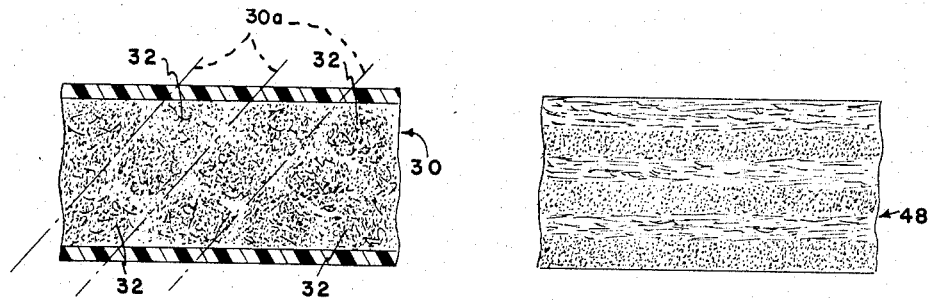
FIGURE 5 is a broken away cross sectional view of a fish scale type laminate forming of an embodiment of the material of the invention taken on line 5—5 of FIGURE 2.
FIGURE 6 is a broken away enlarged cross sectional view of a flat type laminate forming another embodiment of the material of the invention.

FIGURE 5 illustrates a vertical cross sectional view of the fabric of FIGURE 2 taken on the line 5—5 thereof. It can be seen that each layer or fish scale pattern, indicated generally by the numeral 30, lays on top of the one adjacent forming a diagonal laminate through the material as best shown by the layer lines 30a in FIG. 5 of the drawings. Notice the ends of the rovings, indicated generally by numeral 32, are each cut along the same plane with the rest of the rovings running along a slant indicated generally by the layer lines 30a. The criss-crossed pattern allows a relative sliding action of the filters in each layer or fish scale pattern as the material may be compressed, elongated or stretched during a subsequent molding operation.

Of course, it should be understood that the interrelated or criss-crossed design of FIGURE 2, shown at the area 10, can only be achieved by a proper laying of the streams or ribbons. If a fish scale type laying, shown by the diamond patterns 11 and 12 in FIGURE 2, is sequentially laid, each pattern, as indicated by the numerals 11 and 12, will lay on top of the next and there will not be a true fabric weave as shown in the area 10. However, a proper movement of the legs defining the diamond shapes 11 and 12 could achieve the desired weave shown in the area 10. Also, a simultaneous laying of two or more of the diamond shapes 11 and 12 in spaced relationship would result in the desired interweaving or interlacing. Nevertheless, the principles and purposes of the invention are achieved by simply aligning and orientating the streams or ribbons of mixed fibers and resin in the criss-cross or fabric relationship so that they tend to form a criss-cross laminate in orientated position. It has been found that flat sheets made up in the manner indicated by FIGURE 2, and forming a material similar to that shown in FIGURE 1, may be pressure molded to desired contours where the loose interrelated relationship of the fibers allows a flowing to all parts of the mold by elongation and a relative sliding action of the criss-crossed patterns while still retaining substantially the cross-hatched characteristic of the fibers as they are laid. It has been found that a slab, such as the slab 40 in FIGURE 7, can increase its lateral boundaries or area in size as much as 1600 percent upon molding before losing the criss-crossed characteristics to an intolerable extent. However, in most cases enlargement of the lateral area or flow up to about 500% is optimum.

Figure 3:
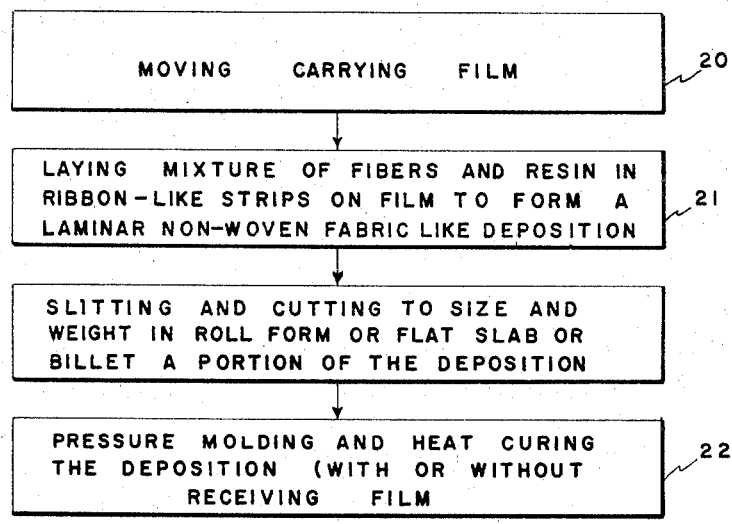
FIGURE 3 is a block diagram of the method steps utilized in manufacturing the material of FIGURE 1.

FIGURE 3 illustrates in block diagram form the process in forming the mold material of FIGURE 1. These steps include positioning and moving the carrying film, indicated by the numeral 20, laying a mixture of fibers and resin in ribbon-like strips on the film to form a laminar, non-woven, fabric-like deposition, indicated by the numeral 21, slitting horizontally and/or cutting vertically off to size and weight in roll form or flat rectangular "slab" or "billet" form a portion of the deposition, and finally pressure molding and heat curing the deposition to form the final material, as indicated by the block 22. It is preferable to remove the release films 1 and 7, as seen in FIGURE 1, from the material 2, after cutting and slitting to size, before molding so such films do not interfere with the flow during molding.

Figure 7:
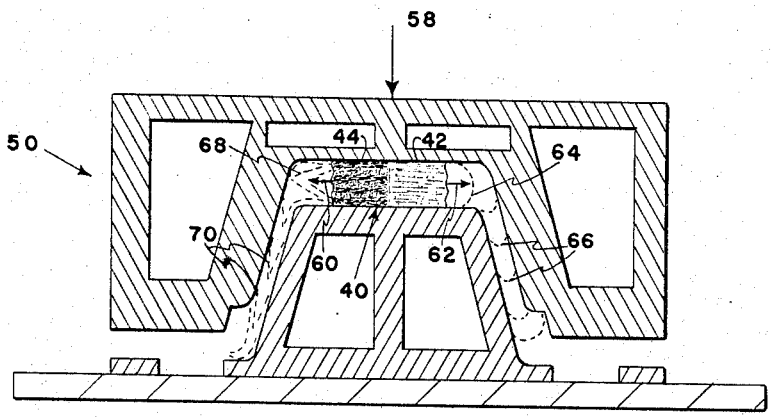
FIGURE 7 is a vertical cross sectional view of a block of the material of FIGURE 6 being molded to a box-like shape also showing a small block of conventional pre-mix and contrasting the flowability of each material during the molding operation.

FIGURE 7 illustrates why the material of the invention flows readily upon molding while retaining the criss-crossed relationship of the fibers or rovings. In an essentially conventional compression molding technique, a heated matched mold 50 shaped like a box receives the material slab 40 approximately the size of the bottom of the box and is closed rapidly under pressure. Closing the mold rapidly initiates a great pressure surge in the direction of the arrow 58. This causes transverse forces indicated by arrows 60 and 62 to be resultant in the material slab 40. As a means of contrasting the improved flow with orientation of fabric-like layer consistency of the material 40 of the invention with that of the conventional pre-mixes, the right half of the slab 40 is indicated as a conventional non-orientated pre-mix 42 while the left half is indicated as a layered orientated material 44 of the invention. Under the influence of the pressure, the conventional material 42 will tend to squeeze or bulge out like toothpaste, indicated by the dotted line 64, further causing a random arrangement of the fibers. Note the squeezed bulge extends down into the narrowed wall portion, also as indicated by the dotted line 66. Conversely, the material 44 slides layer upon layer to form a tongue indicated by the dotted line 68. The layer upon layer sliding of the tongue 68 can be visualized as somewhat similar to a telescoping action. The tongue continues up into the wall portion as indicated by the dotted line 70. Thus, the material 44 slides layer upon layer from the core of its laminar mass and may also have fibers within each layer slide relative to each other to provide a real flow action without losing the criss-crossed relation of the fibers or rovings.

Figure 7A:
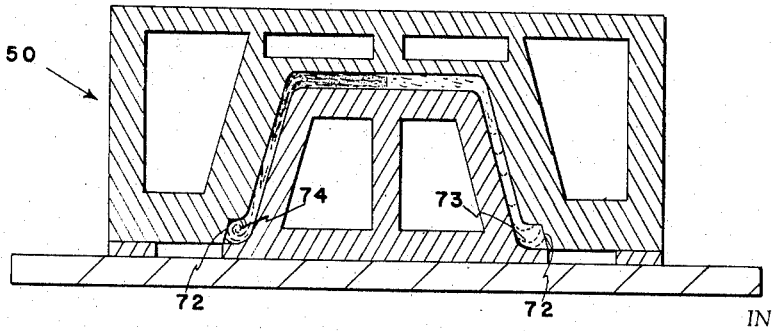
FIGURE 7A shows the mold of FIGURE 7 in the closed position.

Another interesting feature is shown in a lip portion 72 on the mold 50 when the mold 50 is closed as seen in FIGURE 7A. While the squeezed bulge of the conventional material 42 will just push into fill the lip 72 as at 73, the material 44 will actually curl around in a continuing tongue sliding fashion, as indicated by the dotted line 74, to fill the lip 72. Thus, the curled portion 74 is also fiber orientated and provides an extremely strong lip to the molded article.

It is anticipated that any suitable thermosetting polyester resin, epoxy, or equivalent thereof, might be mixed with the glass fibers. The invention contemplates particularly using the polyester resin and/or a suitable epoxy resin with the cure time being controllable by adding suitable and proper catalytic agents. For example, the shelf life, without addition of pressure and heat, could be made to vary anywhere from a few hours to 1 year, so that the material could be made up in pre-impregnated or "B" stage form and stored on rolls or in other suitable manners for later forming and curing by pessure and heat techniques. Material receipts employing polyester or epoxy resins containing unbound laminarly oriented glass fiber reinforcement of one to twelve inches in length in amounts of 20% to 70% of total by weight, with flow control agent or inert filler or combinations thereof ranging from 1% to 55% of total by weight would satisfy the requirements of this invention.

Examples of the pressure and heat utilized for normal curing might be to use a pressure during molding of about 100 p.s.i., which might be varied anywhere from about 50 p.s.i. to about 200 p.s.i. for particular cures, to utilize 250° F. for about 3 minutes, although this could be varied from about 100° F. to 350° F. for time periods of from 1 to 30 minutes. It is anticipated that the nominal thickness for the material before molding will be about .15 to .25 inch, although this thickness would vary with the configuration of the specific part to be molded. Obviously, the thickness could vary from perhaps .05 inch to 1.50 inches. When the greater thickness is desired, several thicknesses or plies of the material can be laid in adjacent or laminated relationship for the final molding and cure. A specific part molded from a common receipt with several plies of thinner material exhibited greater physical strength properties than the same part molded from a single ply of the same size and premolded thickness indicating the desirability of using multiple layers to achieve the best flow properties with the least effect upon fiber orientation and strength of the molded product. In general use of this material, the flat area size of the "slab" or "billet" is selected equal to the size of the largest flat or relatively flat projected area of the part to be molded, such as the base of a four sided box. The thickness of this "slab" or "billet" may be determined by calculation from either the weight or volume of material required to "fill out" the molded shape.

It is not necessary that the material formed have the streams or ribbons of material laid in a criss-crossed pattern with interweaving or interlacing. Actually, as in normal pneumatic tire manufacture, the layers may be laminated with each layer having the fibers or rovings therein being at right angles to each other. FIGURE 6 represents a material 48 formed in this manner. In the material 48 the layer will still be in criss-crossed or right angle relation to each other to allow sliding layer upon layer or pantographing of the fibers in the layers relative to each other to achieve the desired flow objectives of the invention.

Of course, it should be understood that the material of the invention need not be pressure molded to a desired shape. It might be sprayed over the desired mold under a fast room temperature cure. The material might also be formed with a foaming resin agent to thereby produce a fiber reinforced foam material. Similarly, the material including a foaming resin might be sprayed over a desired mold shape. Generally, the invention anticipates that a fiber reinforced resinous foam material will not flow well under pressure molding, but new foaming resins might permit pressure molding before final foaming and curing takes place. The addition of glass spheres or pre-expanded plastic beads in the foamable material have been found to reduce the specific gravity thereof and enhance the moldable properties of such foam structural material.

Thus, it is seen that the objects of the invention have been achieved by providing a fiber reinforced molded material which may be formed on a base release film as it moves along by utilizing a spraying technique for depositing a plurality of streams or ribbons of material in a criss-cross pattern thereon as an interwoven relationship, or a fish scale interrelated technique to orient a mixture of resins and fibers in specifically orientated directions to simulate a fabric relationship, yet allowing ready flowability of the material during a molding process. This technique allows an initial forming of the material with ultimate curing being performed by the addition of heat and pressure. The use of a release film or carrier material enhances the handling properties of the material during storage and production processing, but is not necessary for the molding technique. The material may also be adapted to non-molding techniques and use with a foaming resin.

While in accordance with the Patent Statues only one best known embodiment of the invention has been illustrated and described in detail, it is to be particularly understood that the invention is not limited thereto and thereby, but that the inventive scope is defined in the appended claims.

What is claimed is:

1. A method for forming fiber reinforced materials which includes the steps of
preparing a mixture of fibers of discrete lengths with a resin and a curing agent,
forming the mixture into streams,
depositing the streams onto a surface into a geometric pattern of overlapping, criss crossed interrelated layers to form a laminated sheet thereon,
removing the formed laminated sheet from the surface,
cutting the laminated sheet into a predetermined size,
placing the cut laminated sheet within a heated mold having a cavity area greater than the area of the cut sheet, said mold having die members which press the laminated sheet in a manner to cause the layers within the said sheet to progressively flow throughout the mold cavity by the layers being forced to extend and progressively slide over each other in a staggered, overlapping relationship to uniformly fill the mold cavity with the laminated sheet while substantially retaining the overlapped interrelated relationship of each of the criss crossed patterns, and
pressing the sheet filling the mold under sufficient pressure, temperature, and time to effect complete molding of the sheet to the mold cavity and curing the formed sheet.

2. A method according to claim 1 where pressure of between 50 to 200 p.s.i. and temperatures of between 100° F. to 350° F. for times of from one to thirty minutes are used to achieve a cure of the material, and where the lengths of the fibers are between 1 and 12 inches.

3. A method according to claim 1 where at least two pieces of the predetermined cut size of the laminated sheet are stacked in laminated form in the heated mold where a greater thickness and spreading action are desired.

4. A method of according to claim 1 wherein the majority of the fibers are oriented within the formed streams in an elongated aligned relationship with the streams.

5. A method according to claim 1 where the fibers are glass and the majority of the glass fibers are oriented within the formed streams in an elongated aligned relationship with the streams; and where the majority of the fibers within each stream overlap with the other fibers within the stream.

6. A method according to claim 1 in which said resin is a foaming resin and a plurality of glass spheres are intermixed with the mixture of resin, curing agent and fibers prior to forming said streams, said glass spheres serving to reduce the specific gravity and increase the moldability of the formed material.

7. A method according to claim 1 in which said resin is a foaming resin and a plurality of pre-expanded plastic beads are intermixed with the mixture of resin, curing agent and fibers prior to forming said streams, said plastic beads serving to reduce the specific gravity and increase the moldability of the formed material.

References Cited

UNITED STATES PATENTS 2,618,019  11/1952  Orsini _____ 264—331

FOREIGN PATENTS 565,595  1/1942  England.

ROBERT F. WHITE, *Primary Examiner.*

J. R. HALL, *Assistant Examiner.*